(12) United States Patent
Chang

(10) Patent No.: US 9,068,505 B1
(45) Date of Patent: Jun. 30, 2015

(54) HEAT DISSIPATION TYPE STARTING FLY WHEEL OF A MODEL VEHICLE GASOLINE ENGINE

(71) Applicant: GOLDEN LION ENTERPRISE CO., LTD., Taichung (TW)

(72) Inventor: Lien-Sheng Chang, Taichung (TW)

(73) Assignee: GOLDEN LION ENTERPRISE CO., LTD., Taichung (TW)

(*) Notice: Subject to any disclaimer, the term of this patent is extended or adjusted under 35 U.S.C. 154(b) by 0 days.

(21) Appl. No.: 14/185,714

(22) Filed: Feb. 20, 2014

(51) Int. Cl.
*F02B 63/00* (2006.01)
*F01P 5/06* (2006.01)
*F02B 75/34* (2006.01)
*F01P 5/02* (2006.01)

(52) U.S. Cl.
CPC .. *F02B 75/34* (2013.01); *F01P 5/02* (2013.01)

(58) Field of Classification Search
CPC ............ F02B 63/02; F02B 63/00; F01P 5/02; F01P 5/06; F01P 1/06
USPC ....................... 123/192.1, 41.11, 41.49, 41.65
See application file for complete search history.

(56) References Cited

U.S. PATENT DOCUMENTS

| | | | | |
|---|---|---|---|---|
| 2,157,666 A | * | 5/1939 | Jacobi ......................... | 123/41.65 |
| 2,446,919 A | * | 8/1948 | Goldberg et al. ......... | 123/195 A |
| 2,693,789 A | * | 11/1954 | Lechtenberg .............. | 123/41.65 |
| 6,314,922 B1 | * | 11/2001 | Zimmermann et al. ... | 123/41.65 |
| 2001/0037776 A1 | * | 11/2001 | Husges et al. ............. | 123/41.65 |
| 2012/0186386 A1 | * | 7/2012 | McCombs ................ | 74/572.21 |

FOREIGN PATENT DOCUMENTS

| | | | | |
|---|---|---|---|---|
| EP | 931940 A2 | * | 7/1999 | |
| JP | 57073833 A | * | 5/1982 | |
| JP | 06086519 A | * | 3/1994 | |
| JP | 09200070 A | * | 7/1997 | |
| JP | 2002095195 A | * | 3/2002 | |

* cited by examiner

*Primary Examiner* — Lindsay Low
*Assistant Examiner* — Kevin Lathers
(74) *Attorney, Agent, or Firm* — Ming Chow; Sinorica, LLC

(57) ABSTRACT

A heat dissipation type starting fly wheel of a model vehicle gasoline engine includes a main body formed with a through hole in the center and having its outer circumferential side annularly provided with a protruding ring, which has one side fixed thereon with a plurality of blades. Thus, when driven to rotate, the main body and the protruding ring will produce an effect of a fly wheel, and when rotated, the blades on the protruding ring will disturb air to form air convection, able to attain an object of enhancing heat dissipation efficacy of the model vehicle gasoline engine.

9 Claims, 7 Drawing Sheets

HEAT DISSIPATION TYPE STARTING FLY WHEEL OF A MODEL VEHICLE GASOLINE ENGINE

BACKGROUND OF THE INVENTION

1. Field of the Invention

This invention relates to a model vehicle gasoline engine, particularly to a heat dissipation type starting fly wheel of a model vehicle gasoline engine.

2. Description of the Prior Art

Generally, a conventional model vehicle employs a small-sized gasoline engine as a power source. The conventional model vehicle gasoline engine, as shown in FIG. 1, includes a gasoline engine 1 provided with a spark plug 2 and a piston 3 that is connected with an output shaft 4. Thus, when the piston 3 and the output shaft 4 are rotated together, the gasoline engine 1 can output power through the output shaft 4. To enable the gasoline engine 1 to be operated smoothly, the output shaft 4 of the gasoline engine 1 is usually provided thereon with a fly wheel 5 to be rotated together with the output shaft 4 and by rotational inertia of the fly wheel 5, the output shaft 4 can be rotated with smoothness and the piston 3 can carry out reciprocating motion smoothly and regularly, able to attain an effect of smooth operation of the gasoline engine 1.

To have the conventional model vehicle gasoline engine installed in a model vehicle, the gasoline engine 1 must be small in size and as a result, the heat-dissipating surface of the gasoline engine 1 is small; therefore, the conventional model vehicle gasoline engine is undesirable in heat dissipation, always rendering the gasoline engine overheating and affecting normal operation and even resulting in damage to the gasoline engine. In view of foresaid drawbacks of the conventional model vehicle gasoline engine, the inventor of this invention thinks that the conventional model vehicle gasoline engine is really necessary to be ameliorated and hence devises this invention.

SUMMARY OF THE INVENTION

The objective of this invention is to offer a heat dissipation type starting fly wheel of a model vehicle gasoline engine. When driven to rotate, the fly wheel will disturb air to form air convection, able to attain efficacy of enhancing heat dissipation of the model vehicle gasoline engine.

The heat dissipation type starting fly wheel of a model vehicle gasoline engine in the present invention includes a main body formed with a through hole along its shaft center and having its outer circumferential side annularly provided with a protruding ring, which has one side fixed with thereon with a plurality of blades.

When driven to rotate, the main body and the protruding ring will produce an effect of a fly wheel, and when rotated, the blades on the protruding ring will disturb air to form air convection, able to achieve an object of elevating heat dissipation efficacy of a model vehicle gasoline engine.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
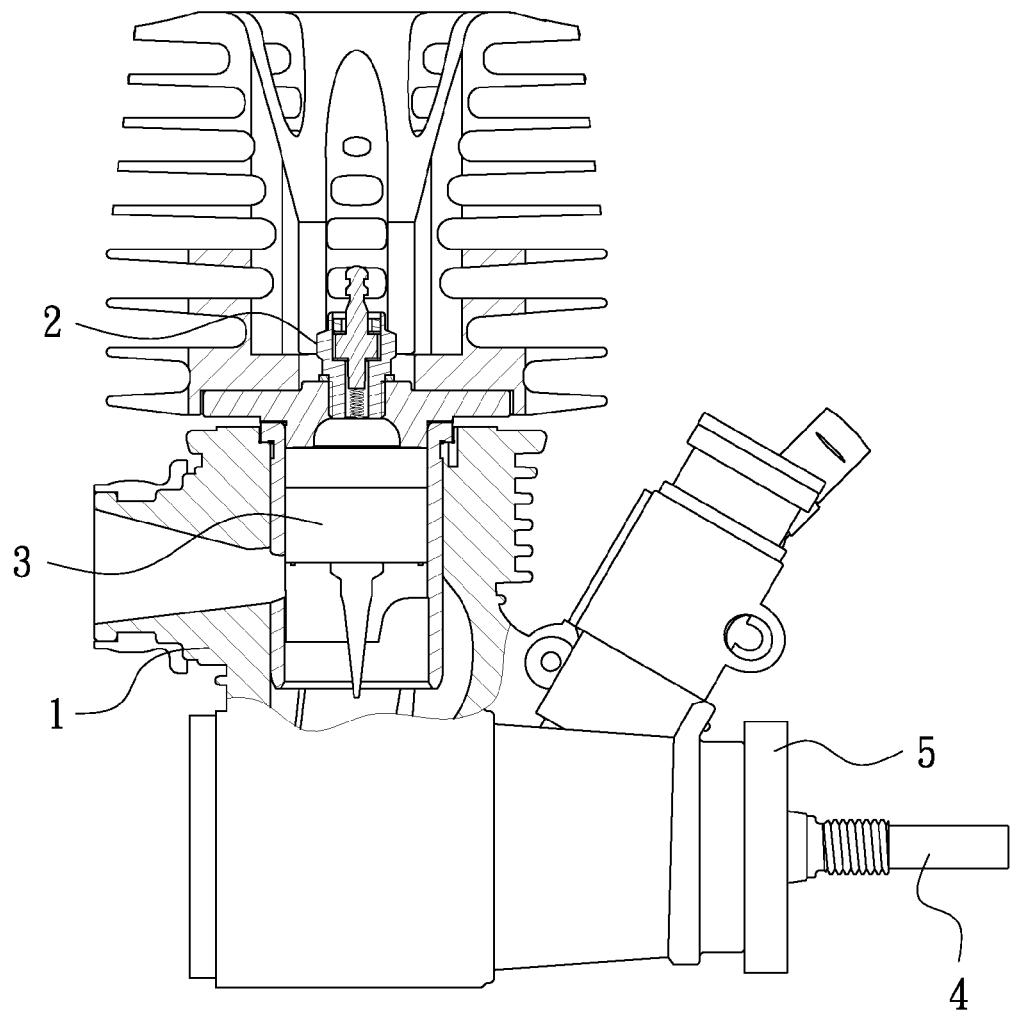
FIG. 1 is schematic view of a conventional model vehicle gasoline engine.
Figure 2:
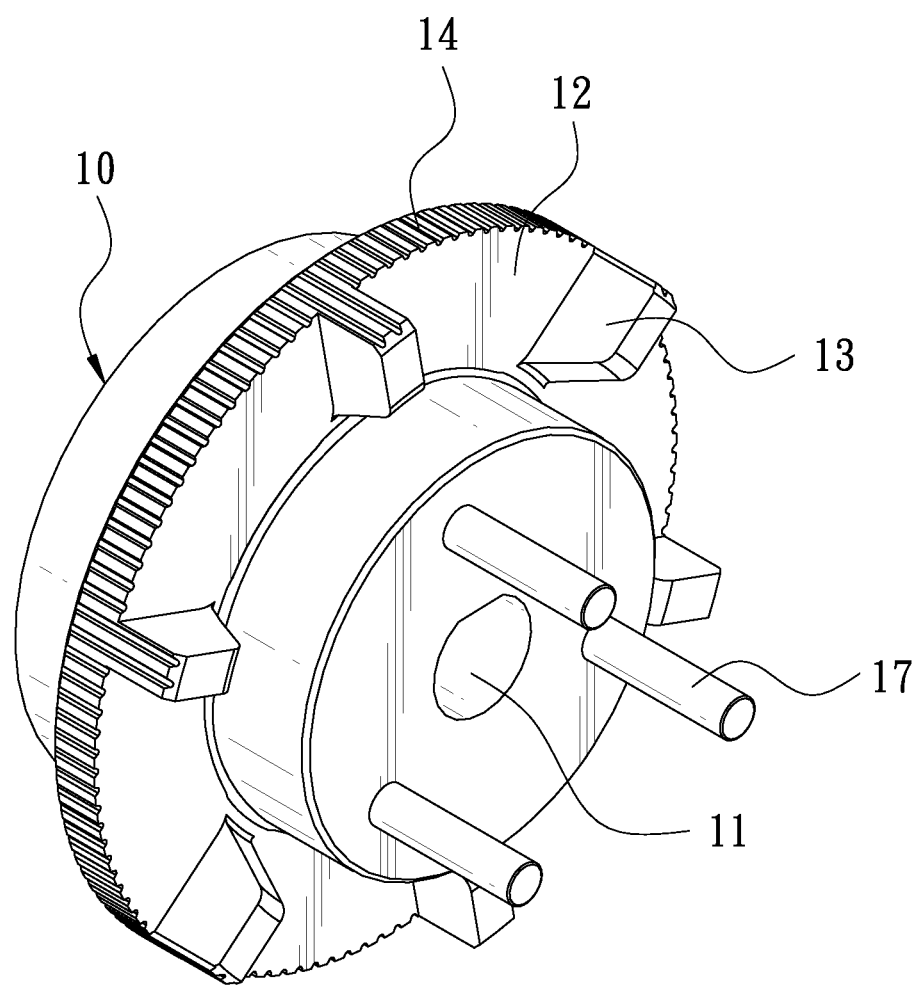
FIG. 2 is a perspective view of a heat dissipation type starting fly wheel of a model vehicle gasoline engine in the present invention.
Figure 3:
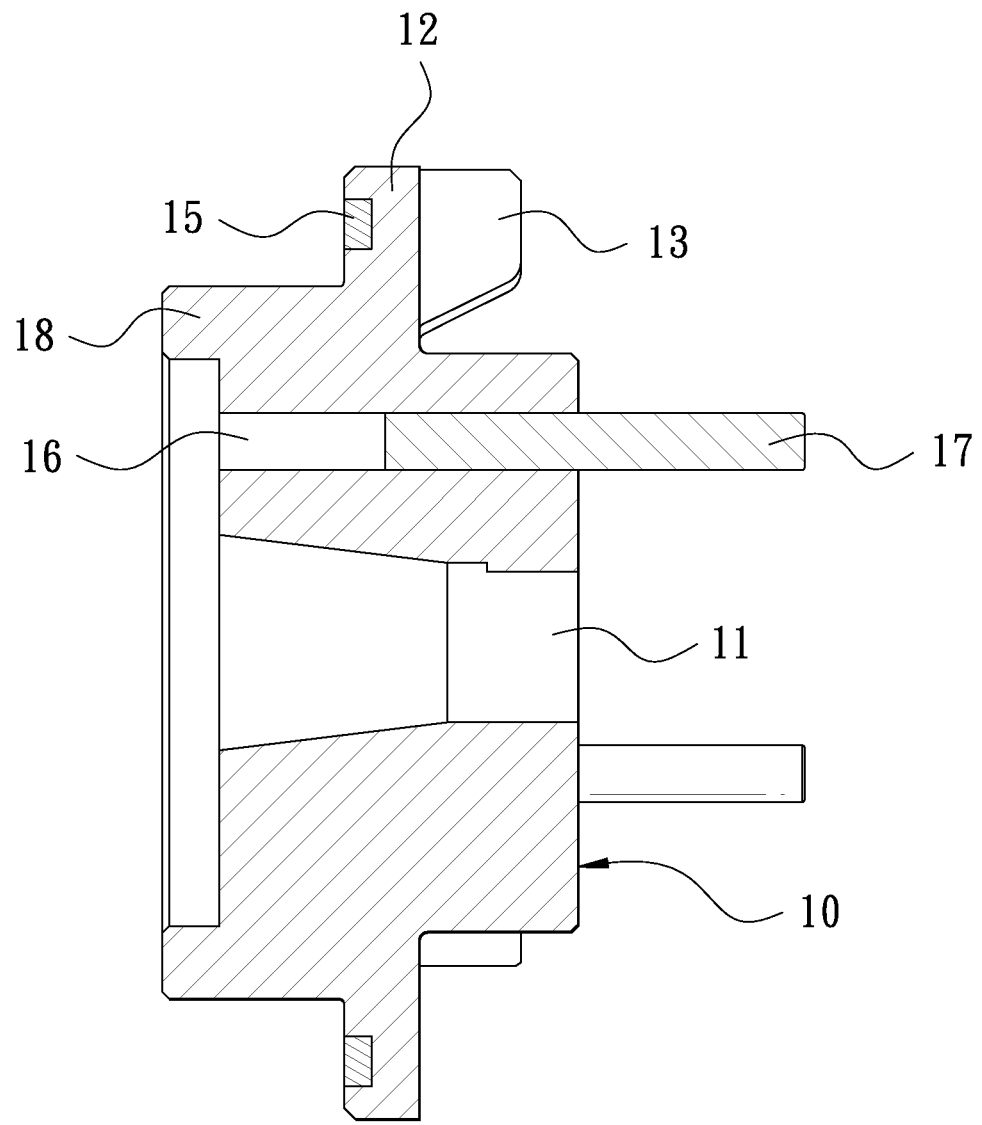
FIG. 3 is a cross-section view of the heat dissipation type starting fly wheel of a model vehicle gasoline engine in the present invention.
Figure 4:
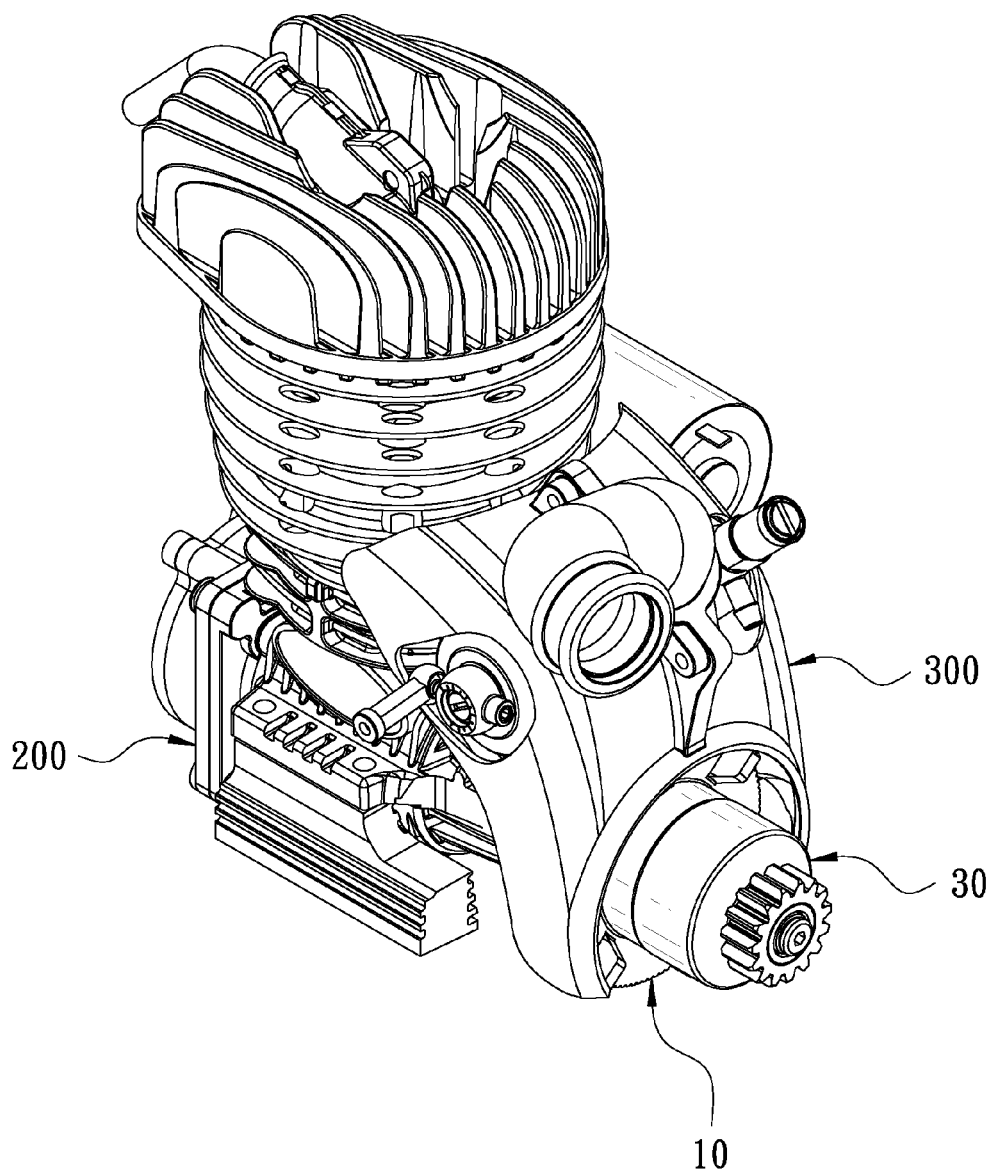
FIG. 4 is a schematic view of the heat dissipation type starting fly wheel in a using condition in the present invention.
Figure 5:
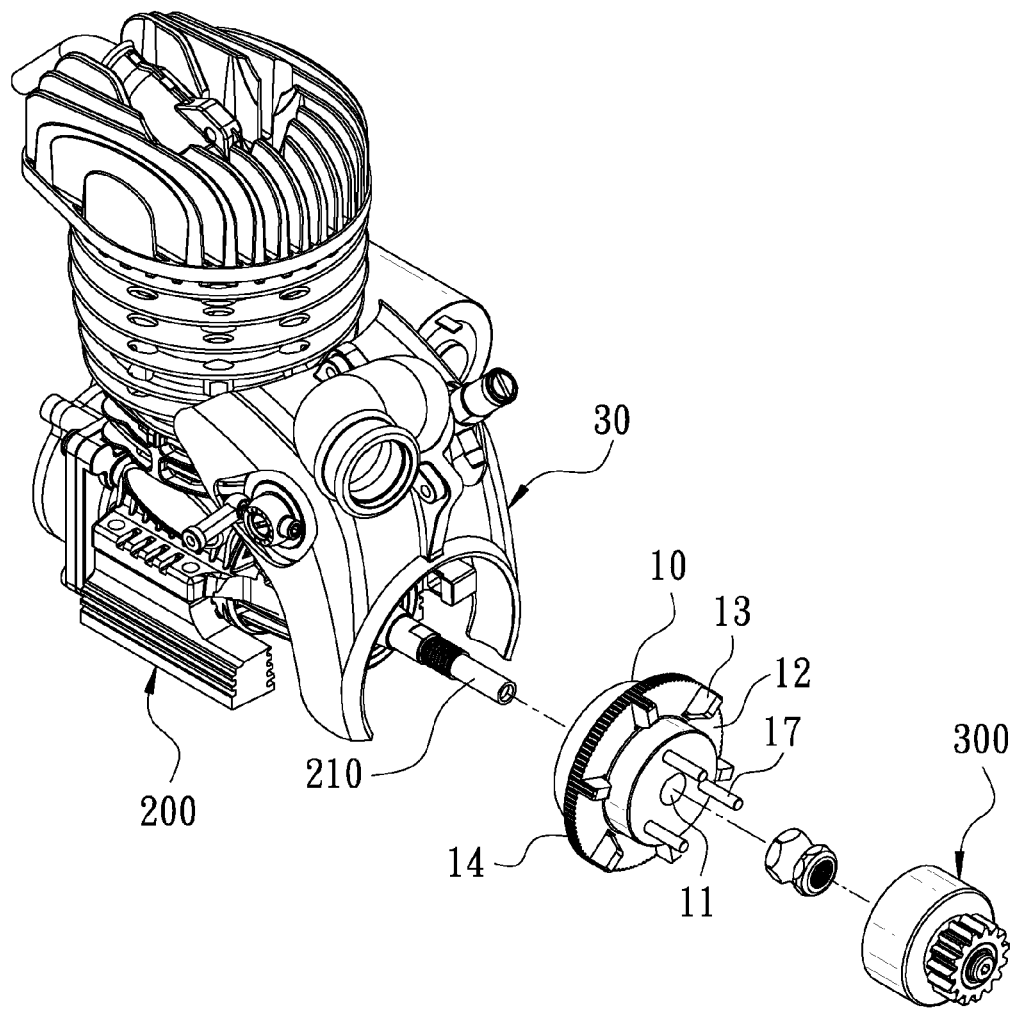
FIG. 5 is an exploded perspective view of the heat dissipation type starting fly wheel in a using condition in the present invention.
Figure 6:
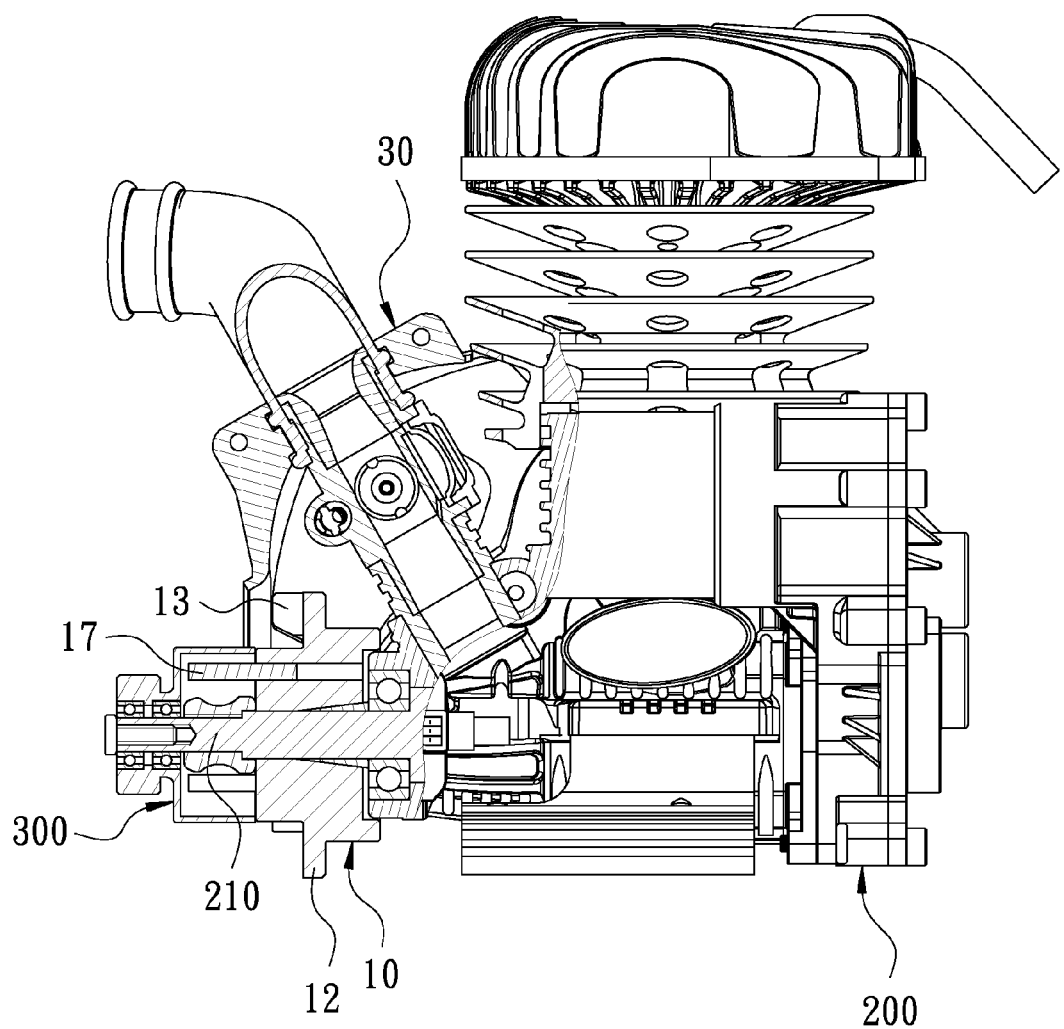
FIG. 6 is a longitudinal sectional view of the heat dissipation type starting fly wheel in a using condition in the present invention.
Figure 7:
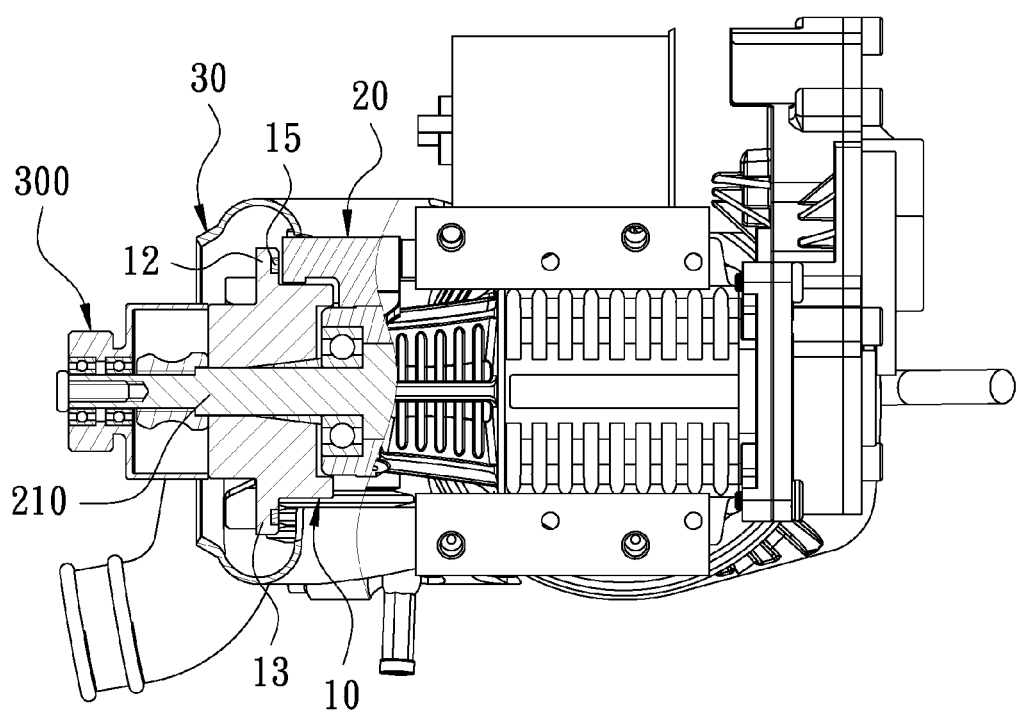
FIG. 7 is a cross-sectional view of the heat dissipation type starting fly wheel in a using condition in the present invention.

A preferred embodiment of a heat dissipation type starting fly wheel of a model vehicle gasoline engine in the present invention, as shown in FIGS. 2 and 3, includes a main body 10.

The main body 10 is bored with a through hole 11 along its shaft center and has outer circumferential side annularly provided with a protruding ring 12 having one side secured thereon with a plurality of blades 13 protruding outward and positioned at the outer circumferential edge of one side of the protruding ring 12, having the outer circumferential sides of the blades 13 and the outer circumferential side of the protruding ring 12 cut flush. In this invention, the blades 13 are respectively and axially formed into a trapezoid shape, respectively having one side formed with a slope slanting toward the center of the main body 10, letting the blades 13 gradually contracted toward a portion that is far away from the protruding ring 12. Further, the outer circumferential side of the protruding ring 12 and the outer circumferential side of the blades 13 are respectively formed with a plurality of recesses 14 stretching axially along the protruding ring 12, and the protruding ring 12 is set with a magnet 15 at the opposite side of the each blade 13 and the magnet 15 is far away from the center of the main body 10 and adjacent to the outer circumferential edge of the protruding ring 12. Furthermore, the main body 10 is provided with three insert holes 16 spaced apart equiangularly at the outer circumferential side of the through hole 11 and axially passing through the main body 10. The insert holes 16 are respectively inserted therein with a protruding post 17 extending outward at one side of the protruding ring 12, where the blades 13 are provided, and the main body 10 has the opposite side of the protruding posts 17 annularly provided with a projecting edge 18 protruding axially at the outer circumferential edge of the main body 10.

Referring to FIGS. 4-7, the main body 10 of the heat dissipation type starting fly wheel of this invention is to be fitted around an output shaft 210 of an engine 200 to have the output shaft 210 inserted through the through hole 11 of the main body 10 to enable the output shaft 210 to drive the main body 10 to rotate together and thus, by both the main body 10 and the rotational inertia of the protruding ring 12 positioned at the outer circumferential side of the main body 10, the main body 10 and the protruding ring 12 can produce an effect of a fly wheel. In addition, the protruding posts 17 of the main body 10 are provided to extend outward so a clutch 300 can be fitted on the protruding posts 17 and combined with the main body 10. Thus, when the engine 200 is operated to drive the output shaft 210 to rotate, the main body 10 together with the clutch 300 will be actuated to rotate and, when the output shaft 210 is rotated to critical velocity, the clutch 300 will be meshed with a driving shaft of a vehicle by action of centrifugal force to have driving force transmitted to the wheels of a vehicle to let the vehicle produce power for moving forward and backward.

One special feature of this invention is that the protruding ring 12 of the main body 10 is provided thereon with a plurality of blades 13; therefore, when the output shaft 210 drives the main body 10 to rotate, the blades 13 will disturb air to form air convection. Moreover, the heat dissipation type starting fly wheel of a model vehicle gasoline engine of this invention further has the circumferential side of the engine 200 provided with a wind-guiding cover 30 for covering the outer circumferential side of the main body 10. Thus, air convection produced by the blades 13 can be guided to the circumferential side of the engine 200 via the wind-guiding cover 30, able to enhance heat dissipation efficacy of the engine 200 through air convection.

Another special feature of this invention is that a Hall sensor 20 is installed at the opposite side of the blades 13 of the protruding ring 12 and positioned at one side of the engine 200. The Hall sensor 20 is separated from the protruding ring 12 at a predetermined distance and provided correspondingly with the magnet 15 for sensing the rotating speeds of the main body 10 of the heat dissipation starting fly wheel of a model vehicle gasoline engine and for judging the rotating speeds of the output shaft 210 of the engine 200.

Additionally, when the engine 200 is not yet started, the output shaft 210 connected with the engine 200 can be turned around to drive the engine 200 to start. The main body 10 of the heat dissipation starting fly wheel of this invention is to be fitted on the output shaft 210, and the circumferential surface of the protruding ring 12 of the main body 10 is provided with plural axial recesses 14 for achieving an effect of anti-skid. Thus, a user can easily turn around the main body 10 to drive the output shaft 210 to rotate for starting the engine 200 so the heat dissipation type starting fly wheel of a model vehicle gasoline engine has an effect of a starting fly wheel.

While the preferred embodiment of the invention has been described above, it will be recognized and understood that various modifications may be made therein and the appended claims are intended to cover all such modifications that may fall within the spirit and scope of the invention.

What is claimed is:

1. A heat dissipation type starting fly wheel of a model vehicle gasoline engine comprising:
   a main body;
   said main body being provided with a through hole along a shaft center,
   said main body being inserted on an output shaft of an engine through said through hole,
   said main body having an outer circumferential side annularly being disposed with a protruding ring;
   said protruding ring having one side being provided thereon with a plurality of blades;
   said blades being radially positioned along said protruding ring;
   said main body and said protruding ring producing an effect of a fly wheel when an output shaft of an engine drives both said main body and said protruding ring to rotate;
   said blades being rotated to disturb air to form air convection for attaining an object of enhancing heat-dissipating efficacy of said engine; and
   said protruding ring having a circumferential surface being disposed with a plurality of recesses extending axially along said protruding ring; and
   said blades having their outer circumferential sides respectively being formed with a plurality of recesses stretching axially along said protruding ring.

2. The heat dissipation type starting fly wheel of a model vehicle gasoline engine as claimed in claim 1, wherein said blades are positioned at an outer circumferential edge of one side of said protruding ring, and both the outer circumferential sides of said blades and of said protruding ring are cut flush.

3. The heat dissipation type starting fly wheel of a model vehicle gasoline engine as claimed in claim 1, wherein said blades respectively have one side facing a center of said main body and formed with a slant, letting each said blade formed into a trapezoid shape.

4. The heat dissipation type starting fly wheel of a model vehicle gasoline engine as claimed in claim 1, wherein another side of said protruding ring is installed with a magnet and a Hall sensor, said Hall sensor and said magnet provided correspondingly, said Hall sensor separated from said protruding ring at a predetermined distance.

5. The heat dissipation type starting fly wheel of a model vehicle gasoline engine as claimed in claim 4, wherein said magnet is far away from a center of said main body and adjacent to an outer circumferential edge of said protruding ring.

6. The heat dissipation type starting fly wheel of a model gasoline engine as claimed in claim 1, wherein said main body is provided with a plurality of protruding posts at one side, where said blades are provided, and said protruding posts are spaced apart and positioned at an outer circumferential side of said through hole.

7. The heat dissipation type starting fly wheel of a model vehicle gasoline engine as claimed in claim 6, wherein said main body is bored with a plurality of insert holes, and said insert holes are spaced apart and located at the outer circumferential side of said through hole, said insert holes axially passing through said main body for said protruding posts to be respectively inserted therein.

8. The heat dissipation type starting fly wheel of a model vehicle gasoline engine as claimed in claim 6, wherein said main body has another side annularly formed with a projecting edge, said projecting edge provided at an outer circumferential edge and axially protruding toward said main body.

9. The heat dissipation type starting fly wheel of a model vehicle gasoline engine as claimed in claim 1, wherein a wind-guiding cover is covered on the outer circumferential side of said main body.

* * * * *